Fig. 2.

Inventor
William Walter Hartman

Attorney.

Sept. 5, 1933.   W. W. HARTMAN   1,925,143
BREAD SLICER
Filed Feb. 17, 1930   7 Sheets-Sheet 5

Inventor.
William Walter Hartman

Attorney.

Sept. 5, 1933.  W. W. HARTMAN  1,925,143
BREAD SLICER
Filed Feb. 17, 1930   7 Sheets-Sheet 6

Inventor.
William Walter Hartman.

Attorney.

Sept. 5, 1933.                W. W. HARTMAN                    1,925,143
                                BREAD SLICER
                            Filed Feb. 17, 1930         7 Sheets-Sheet 7

Inventor
William Walter Hartman

Attorney.

Patented Sept. 5, 1933

1,925,143

UNITED STATES PATENT OFFICE 1,925,143

BREAD SLICER

William Walter Hartman, Los Angeles, Calif.

Application February 17, 1930. Serial No. 429,050

33 Claims. (Cl. 146—153)

This invention relates to slicing machines, more especially to machines for slicing whole loaves of bread. Such machines are used in bakeries to slice a large part of the daily output of bread and so are designed in such a way as to be capable of handling the entire loaf at once on a production basis. Such machines may also be used in smaller concerns to slice loaves to meet the individual customer's demands. It is to be understood, however, that although the present invention has been particularly designed for the slicing of bread, and will therefore be described mainly in that specific aspect, that it may be adapted to cut or handle other articles by suitable minor changes in detail and design and still remain within the scope of my invention.

The increased demand for ready sliced bread has made necessary increased capacity, greater convenience of operation, and maximum cutting efficiency of slicing machines. In present day distribution systems the bread baked each day must be ready for delivery early the next day so that only a comparatively short time is available to devote to the additional operation of slicing the bread without delaying its distribution. Increased capacity of the machines is also necessary to reduce the number of machines required to slice a given quantity of bread, to also reduce the total capital investment, and to indirectly reduce the cost per loaf of the slicing.

Machines must be made to operate with a minimum amount of labor or attendants, and all unnecessary operations must be eliminated. After a loaf has been sliced it is sometimes preferable to hold it together in pre-sliced loaf form, and for this purpose it is customary to apply a cardboard tray, or other simple appliance, to the sliced loaf so that the loaf can be held together and conveniently transferred to and wrapped by an ordinary bread-wrapping machine. Bands of paper or the like may be used instead of the paper tray, though I shall refer to the latter in my description. It is an object of my invention to eliminate any handling of the bread itself by an operator during this process of applying a tray or restraining device to the bread, and for this purpose to provide means for carrying the bread past the operator bottom side up so as to permit applying the tray easily and quickly.

Maximum cutting efficiency must be attained to permit rapid slicing of the bread without deforming the loaf and to obtain a clean cut that produces no crumbs and leaves the surfaces of the slices smooth. This not only permits of rapid passage of the bread through the cutters but produces a high grade product, and most of all this high speed slicing is necessary in order to keep step with the high speed wrapping machines with which most bakeries are equipped.

To accomplish these ends, in a slicing machine typical of my invention, the bread is placed bottom side down on a conveyor belt, which is the easiest and most natural way to place it; also I provide a rotary carrier, continuously moving forward, to pass the bread through the knives or cutter blades; and provide a mechanism to turn the bread bottom side up as it is placed in the rotary carrier. The carrier is so arranged as first to present a bottom corner of the loaf to the knives instead of the broad expanse of one side or the top, which thereby reduces the initial cutting resistance to a minimum. A further advantage of this position is that after the bread is sliced the bottom of the loaf is presented to the operator who can place the tray thereon without handling the bread or removing it from the carrier. Further rotation of the carrier restores the bread to the upright position in which it may be introduced into a wrapping machine.

To slice the bread I use a set of knives or cutters traveling at a high speed, yet the knives themselves, and the driving mechanism, are light in weight, but strong, and so designed as to be well balanced and vibrationless, thus insuring smooth operation and long life.

These and other objects and advantages of my invention, having to do more particularly with the construction and operation of the mechanism 90 and the elements thereof, may best be understood by reference to the following detailed description, and to the appended drawings, in which:

Figure 1:
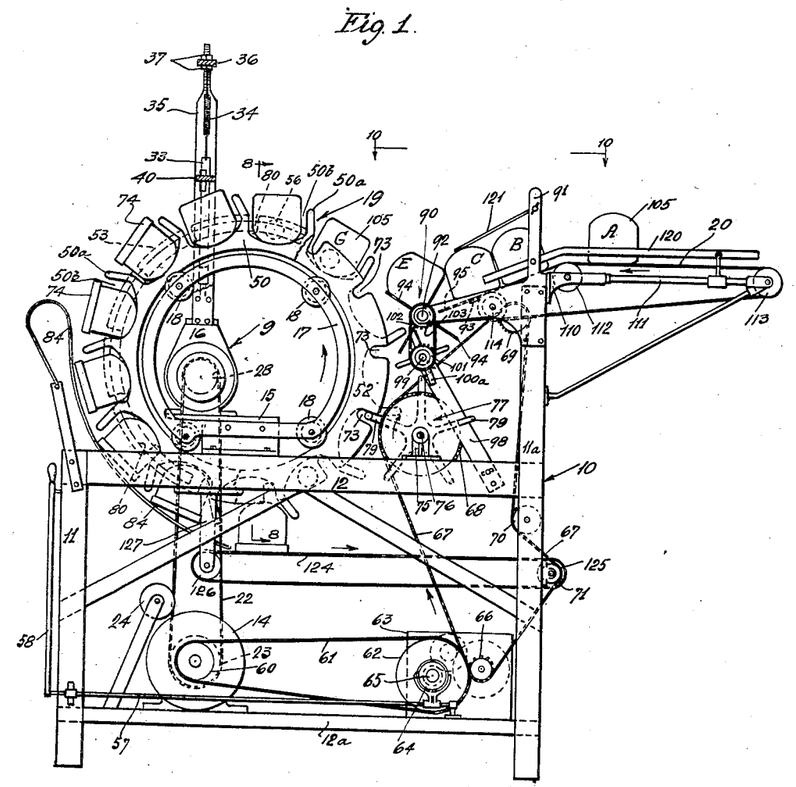
Fig. 1 is a side elevation of the machine, with certain parts broken away or omitted for clarity in illustrating.
Figure 2:
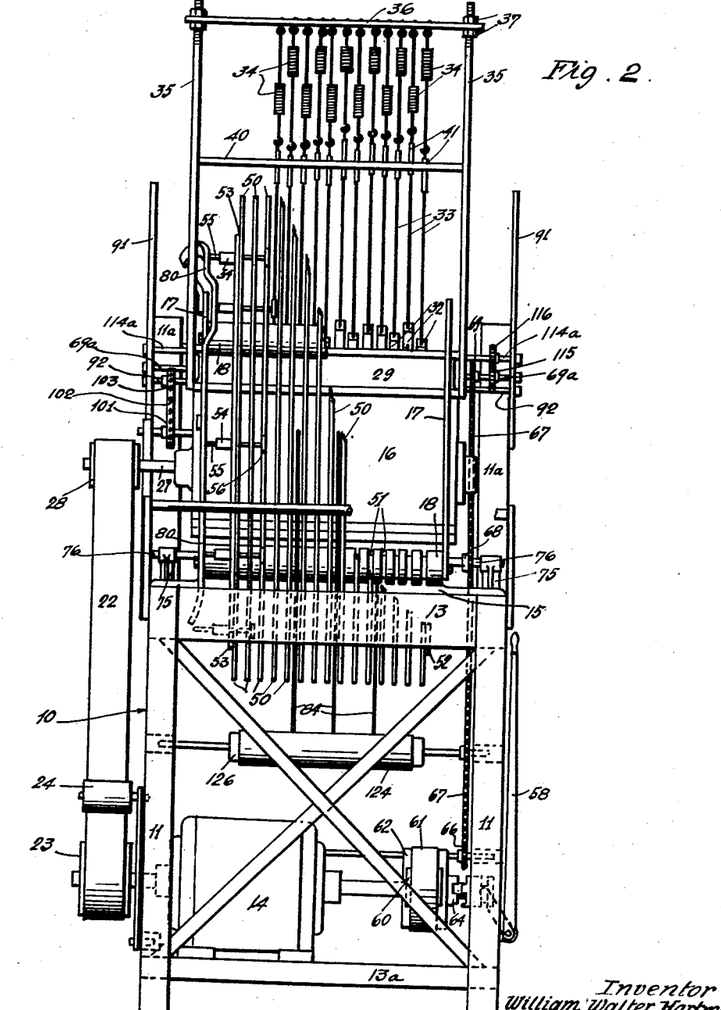
Fig. 2 is an end elevation of the machine, with certain parts broken away or omitted for clarity in illustrating.

Referring first to Figs. 1 and 2, the numeral 10 denotes generally a frame work consisting of front and rear upright members 11 and 11a joined by longitudinal horizontal members 12 and 12a, and transverse horizontal members 13 and 13a, together with suitable cross bracing. Mounted upon the upper horizontal members 12 of this frame structure is a laterally extending base member 15, upon which is mounted the driving mechanism for the reciprocating bread cutting knives or cutters, generally indicated at 9. Also mounted upon this base member 15 is suitable supporting structure for the rotary bread carrier, generally designated by the numeral 19, that forms the preferred means for moving the bread through the cutters. The bread is fed to this carrier by means of a suitable conveyor belt, indicated at 20, and certain mechanism, hereinafter to be set forth in detail, for receiving the bread bottom side down from the belt, inverting it, and feeding it bottom side up to the carrier, all as will be more fully understood as the description progresses.

Figure 3:
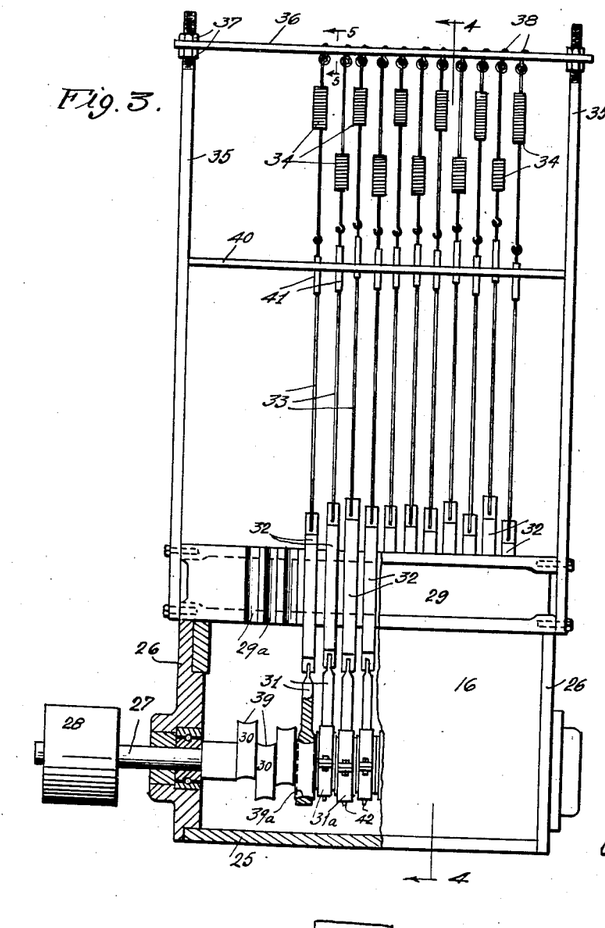
Fig. 3 is a view, partly in section and partly in elevation, showing the slicing head separate from the rest of the machine.
Figure 4:
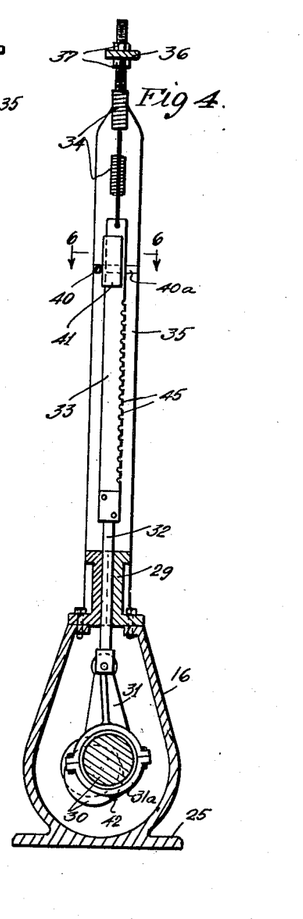
Fig. 4 is a sectional view taken on line 4—4 of Fig. 3.

The cutter driving mechanism, heretofore referred to, includes a horizontal, laterally disposed crank shaft 27, which is housed within a crank case 16 secured through flanges 25 to the frame base 15, the crank case being, in Figs. 3 and 4, shown detached from the rest of the mechanism. The crank case is open at both ends and at the top throughout its entire length, which construction permits the attachment of connecting rods and tappets to the crank shaft before inserting the entire assembly into the crankcase. The ends of the crank case are closed by end plates 26, which carry suitable bearings for journalling the crank shaft 27. A head or tappet guide bar 29 secured down to crank case 16 closes the open upper side thereof. This head is preferably, though not necessarily, vertically split into two halves, which are securely bolted together, the forward half being shown partly broken away in Fig. 3. The advantage of this construction will become apparent hereinafter.

A drive pulley 28 is rigidly attached to the outer end of crank shaft 27; and pulley 28 is driven through a belt 22 from a pulley 23 attached to one end of the shaft of a suitable drive motor 14, which motor may be mounted in the lower part of the frame structure 10. An idler pulley 24 may be provided to remove slack from drive belt 22.

In accordance with the construction preferred at present, the crank shaft 27 is formed with a series of cranks in the form of eccentrics 30, around which are carried the eccentric straps 31a of connecting rods 31, which rods connect to the lower ends of push rods or tappets 32, vertically reciprocable in guide grooves 29a provided between the halves of the longitudinally split tappet guide bar 29. The push rod guides 29a not only provide means for keeping the push rods 32 in alinement and properly spaced, but also provide bearings for these rods.

The upper ends of the push rods 32 are adapted for connection with the lower ends of the knives or cutters 33, while the upper ends of these cutters are connected to the lower ends of tension springs 34, which in turn are attached at their upper ends to a cross bar 36 supported by uprights 35 extending vertically from the opposite ends of the crank case head. The reciprocating push rods move the cutters down and up, while the tension springs 34 act to pull the cutters upwardly and act to prevent any tendency for the cutters, which are ordinarily quite thin and therefore flexible, to buckle or deviate from a straight path under the compression of the quickly rising push rods. By making the cutters of greater rigidity or stiffness or by providing suitable stiffening members these springs may be dispensed with; although the present construction permits the cutters to be very thin, to obvious advantage, as well as simplifying the construction generally, and is therefore preferred.

Figure 5:
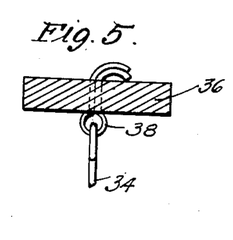
Fig. 5 is a detailed section taken on line 5—5 of Fig. 3.

The cross bar 36 to which the springs 34 are attached is mounted on the threaded upper ends of uprights 35 between adjusting nuts 37, and it is obvious that the tension in the springs may be adjusted to give just the necessary pull on the cutters by raising or lowering the cross bar 36 and locking the same in position by tightening the adjusting nuts. Any suitable method of attaching the springs to this cross bar may be used, one method being shown in Fig. 5 which consists of inserting a cotter key 38 in a hole in the cross bar 36 and bending the cotter key over on top of the cross bar as shown so as to prevent its withdrawal through the hole. The wire from the spring is then inserted in the eye of the cotter key and bent over.

Figure 6:
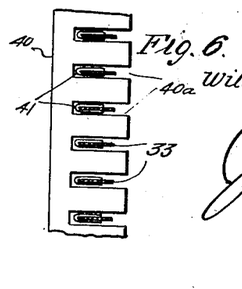
Fig. 6 is a fragmentary view taken on line 6—6 of Fig. 4.

Between members 35 and supported thereby is preferably placed a guide or spacer bar 40 provided in some way with slots 40a through which the cutters 33 work, these slots serving to laterally space and guide the upper end of the cutters. To prevent wearing away of this bar by the rapid motion of the more or less flexible cutters 33, the cutters are preferably provided at the location of the spacing bar 40 with relatively thick bearing members 41 consisting of short U-shaped strips of metal, as shown in Fig. 6, which serve to enlarge the bearing surface between the cutters and the slots, locally along the rear non-cutting side of the blade, as seen in Figs. 4 and 6.

Figure 7:
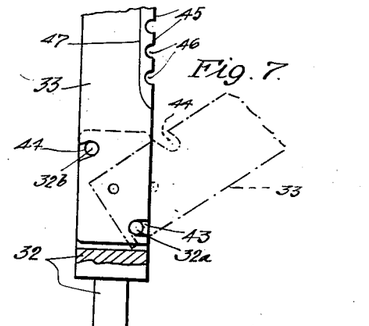
Fig. 7 is a detail of the cutter mounting at its lower end;

The mounting of the cutters at their lower ends is shown in Fig. 7. The cutter blade 33 has on the front or cutting edge a horizontal slot 43 and, on the back edge, a slot 44 located above the slot 43 and cut at an angle to the edge. The head of the push rod 32 is slotted to receive this cutter blade and has a lower pin 32a near the front edge to engage the slot 43, and an upper pin 32b to engage the slot 44, the pins having the same relative position as the slots. That is, with reference to the direction of reciprocation of the blade, the attaching pins 32a and 32b are in offset alignment with respect to each other. To attach the cutter to the push rod, the cutter is inserted in the slotted head so that the pin 32a enters the slot 43, as shown by the dotted line position in Fig. 7. The cutter is then rotated about the pin 32a and the slot 44 is so positioned on the opposite edge of the cutter that the pin 32b will enter it. The cutter being in position, it will be seen that it is held up against the oncoming bread by the pins 32a and 32b; but that the cutter is free to be rotated to the dotted position of Fig. 7 for removal. The top ends of the cutters are detachably connected to loops in the spring wires 34. Since the only forces acting on the blades are the vertical forces of the push rods 32 and springs 34, and the horizontal pressure of the bread against the cutting edge, the cutters always remain rigid, yet they can be removed without the use of any tools and with little loss of time if new cutters are to be inserted.

Figure 7A:
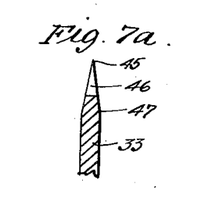
Fig. 7a is an enlarged fragmentary cross section of a cutter.

The cutters themselves may be formed in any desired manner, one type being formed as indicated in Figs. 7 and 7a with teeth 45 having straight longitudinal cutting edges, the teeth being separated by notches 46, the width of which is less than that of the teeth. Such teeth may be formed by notching a suitable strip of steel at short intervals, and then beveling the teeth by grinding them with a flat stone to form a cutting edge. The sharpening bevel is carried from the line 47 to the blade edge without any special operation being performed on the edge of the notches 46 as may be seen from Figs. 7 and 7a. The cutting edge is preferably confined to the straight inter-notch edges because the notch edges are not sharpened. This forms a straight, intermittent cutting edge rather than a continuous one of wavy outline and is found to give a cleaner cut to the bread under actual operating conditions. The edges of the notches may be sharpened if so desired but the above described formation has been found to be a very efficient cutting edge and simple to make. In either case, the primary cutting edge of the blade is formed of straight edged cutting teeth 45 separated by the notches 46.

It is found in practice that it is desirable to operate the cutter blades at high speed with short rapid strokes, and consequently the crank shaft 27 is adapted to be operated at comparatively high rotational speed and the eccentricity of the eccentrics 30 is fairly small. To avoid excessive vibration it is necessary to eliminate as much weight as possible from all moving parts and to so design the parts with relation to each other that they have a high degree of dynamic balance. This balance is obtained by arranging the eccentric cranks in pairs, the cranks in each pair being approximately 180° opposed, and the cranks in successive pairs being angularly displaced or slightly out of phase with each other which results in forming two spiralled and approximately opposed series of cranks along the shaft. Fig. 4 shows a preferable arrangement for the diametric spacing of one pair, and also the angular spacing of the next adjacent pair of cranks. The foregoing arrangement not only gives practically perfect mechanical balance, but from the standpoint of slicing the bread it also produces a very beneficial result by giving a smooth clean slice that is not otherwise procurable especially at high slicing capacity. Obviously the arrangement causes adjacent knives to reciprocate approximately opposite to each other and also causes alternate knives to reciprocate progressively out of phase with each other all across the loaf, and in practice this results in causing the loaf to usually lie quieter during the slicing, instead of tending to jump up and down as when all the knives reciprocate in a single series, or in two series that exactly oppose each other simultaneously across the entire loaf. Such quieter action of the loaf during the slicing naturally results in a smoother and cleaner slice, which is desirable.

The thickness of the slice desired determines the distance between the cutter blades 33 and also the thickness or width of eccentrics 30. Since in any given case this is likely to be comparatively small, there will not be sufficient room between eccentrics to attach ordinary means for holding the eccentric straps against motion in the direction of the axis of the crank shaft. Accordingly, in the present construction the eccentrics are formed with concave bearing surfaces, as shown at 39 on the eccentrics at the left hand end of the crank shaft in Fig. 3, and the bearing surfaces of the eccentric straps are formed with convex complementary bearing surfaces 39a, which simple construction causes the eccentric straps to be retained in proper lateral position upon the eccentrics. The eccentric straps are formed in two halves, as shown in Fig. 4, so that they can be fitted around the eccentrics and then bolted together, after which they cannot shift laterally thereon. A cup 42 is provided on the lower half of each eccentric strap 31 to pick up oil from the interior of the crank case, this oil being delivered from the cup to the bearing surfaces by any suitable provision. In this connection, it is, of course, understood that the crank case being sealed by the end plates 26, and tappet guide bar 29, provides an excellent oil reservoir in which the crank parts run and procure good lubrication.

The preferred means for moving the loaves of bread through the reciprocating cutters will now be described. With reference to Figs. 1 and 2, a pair of upright supports in the form of rings 17 are mounted one at each end of the base member 15; and between these rings are provided a plurality of spaced shafts, here shown as four in number, upon which are rotatably mounted rollers 18. Rotatably carried on or around these rollers 18 is the rotary bread carrier 19, which embodies a plurality of relatively thin disk rings 50, supported in and spaced by peripheral grooves 51 provided at regularly spaced intervals along the rollers 18, as shown best in Fig. 8. The disposition of parts is such that the rings 50 turn through the cutters, the roller grooves 51 being located to laterally position the rings in the spaces between the cutters so that there is no interference therebetween. The disk rings 50 are formed at their outer circumferences with outwardly projecting arms 50a, the formation being such as to form between said arms individual compartments 50b for taking successive loaves of bread, as will be understood from an inspection of the drawings. The two end or outside rings 50 are provided with annular side plates 52 and 53, respectively, which laterally confine the bread within the compartments.

The carrier thus formed by these spaced rings is driven through the medium of a carrier-driver, generally designated by the numeral 77, which embodies a pair of star wheels 79 mounted upon the opposite ends of a lateral shaft 76 journaled in bearing brackets 75 mounted on frame members 12, and bars or, preferably, rollers 78 connecting across between the outer ends of the radial arms of the two star wheels 79. This assembly is so mounted with relation to the bread carrier 19 that the rollers 78 mesh with the projecting arms 50a of the carrier (Fig. 1) and, being driven in a right handed direction, as later to be described, act to continuously rotate the carrier in a left-handed direction, the carrier rings 50 simply rolling around on the supporting rollers 18. The plates 52 and 53 on the end rings are provided with radial slots 73 to take the rollers 78. It will be remembered that the spaced rings 50 of the carrier 19 are not interconnected but are capable of individual movement on the rollers 18, and it will now be seen that the driving rollers 78 of the carrier driver provide means whereby these rings are all moved together and also whereby the rings are maintained in alinement with each other so as to form the continuous bread carrying compartments 50b.

Power for continuously rotating the carrier driver 77 may be derived from the motor 14, in which case a pulley 60 is provided on one end of the motor shaft and by means of a belt 61 drives the pulley 62 of any standard type of reduction gear box, such as is indicated at 63. A clutch 64 is preferably mounted between the pulley 62 and the shaft 65 of the reduction gear box 63, so that by disengaging this clutch the operator is enabled to disconnect the pulley 62 from the shaft and thereby stop this portion of the drive without the necessity of shutting off the motor 14 and thereby stopping the action of the reciprocating cutters. Clutch 64 is operated through a shaft 57 which extends to the front end of the machine, where it is provided with a hand lever 58 located conveniently for an operator standing at the front of the machine. A sprocket wheel 66 on the power take-off shaft of the reduction gear box 63 drives a continuous chain 67 which passes over a gear or sprocket wheel 68 on the shaft 76 of the carrier driver, thence successively over smaller sprockets 69, 70, and 71 mounted on the frame, that have functions which will appear later, and finally back over the sprocket 66.

The rotary carrier 19 is thus in the present instance driven from the motor 14 that drives the cutters, suitable gear reduction being provided to give the required speed to the carrier. It is not necessary, however, that the carrier be driven from the motor 14; it being, in fact, more desirable in some cases to drive the carrier in synchronism with or by the same prime mover that is used for the drive of a wrapping machine used in conjunction with the slicer.

The loaves of bread are placed in the carrier compartments 50b bottom side up, as clearly shown in Fig. 1 of the drawings, and are then carried through the reciprocating cutters. It is especially to be noted that a bottom corner of the loaf is presented to the cutters (see Fig. 15). This method of presenting the loaf is due to the forward inclination of the arms 50a which causes the bottom of the loaf to be tilted through a horizontal to a forwardly inclined position as the loaf meets the cutters; for which purpose the plane of the cutters is located beyond (in the direction of bread movement) the center plane of the carrier 19. Since a lower corner of a loaf of bread is the point of least resistance for the entry of a knife, cutting resistance is thus reduced to a minimum. Also, when the cut is started in this way rather than immediately through the crust of the bread, a faster and also a cleaner cut can be made, for the cutter enters the bread immediately and the bread is not unduly compressed while the cutter is passing through the crust. Another feature of advantage is the "rolling" (and therefore a sort of shearing) motion given the bread as it passes through the cutters, which is also conducive to reduction of cutting resistance, this action being gained by virtue of the employment of a rotary or pivoted carrier for the bread.

Figure 8:
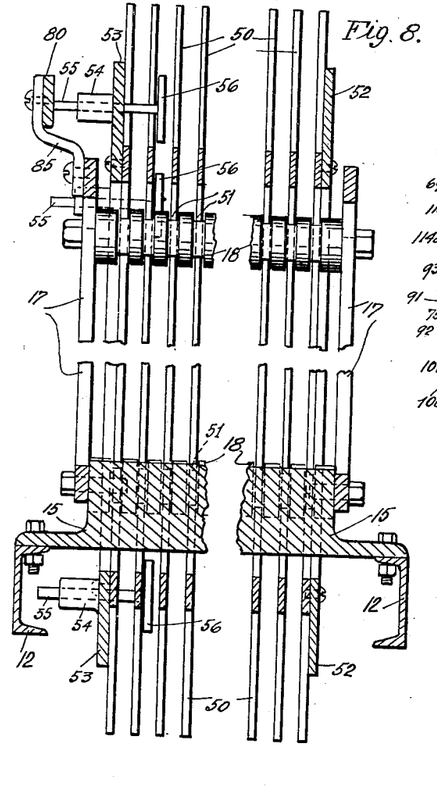
Fig. 8 is a cross sectional view of the rotary carrier mounting, contracted laterally and longitudinally, as taken on line 8—8 of Fig. 1.
Figure 19:
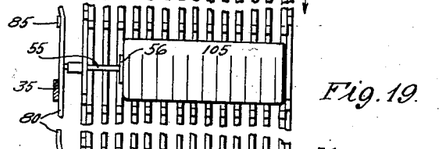

It is found expedient to provide means for laterally holding or guiding the loaves as they are sliced and also after slicing until a holder can be placed on the sliced bread. In one arrangement for accomplishing this purpose the end plate 53 at the left hand end of the carrier, as viewed in Figs. 2 and 8, is provided opposite each bread compartment 50b with a cylindric projection or housing 54 which forms the mounting for a plunger 55 having on its inner end a bread engaging or holding disk 56. This plunger is actuated at the proper time, i. e. just before the loaf comes into contact with the knives, to press its disk against one end of the loaf of break and thereby hold the loaf by end pressure between the disk and the end plate 52 at the other side of the carrier, as indicated in Fig. 19, for instance.

Figure 9:
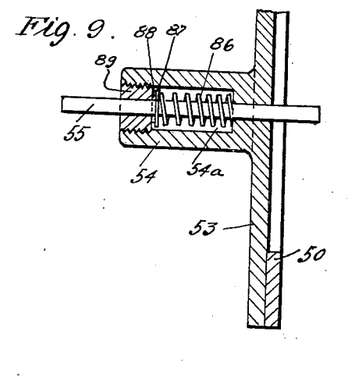
Fig. 9 is a cross sectional detail of the plunger rod mounting.
Figure 10:
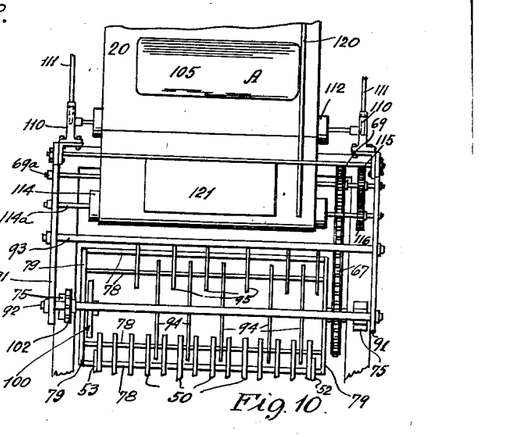
Fig. 10 is a fragmentary plan view as taken on line 10—10 of Fig. 1.

The details of the mounting of a plunger on the plate 53 are shown in Fig. 9. The cylindric housing 54 is bored through to slidably take the rod 55, and then counter-bored from its outer end as at 54a. A compression spring 86 is placed in counter-bore 54a around the plunger 55, a washer 87 is provided on the plunger next to the end of the spring, and a pin 88 is placed in the plunger to hold the washer against the spring. The outer end of the counter-bore is tapped, and a bushing 89 screwed therein, as shown. The spring 86 is under some normal compression in the position of Fig. 8, and the bushing 89 holds the plunger against further outward movement from that position.

Figure 11:
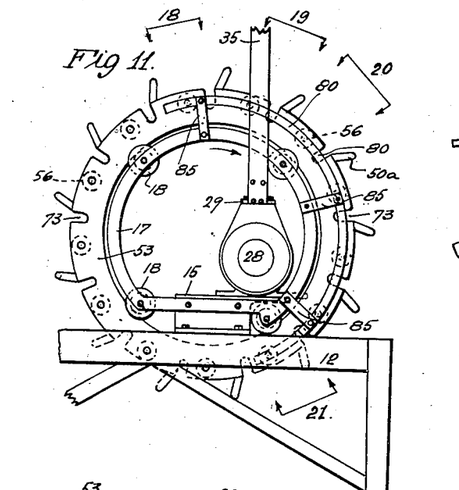
Fig. 11 is a somewhat diagrammatic elevation of the machine showing the mounting of the cam.
Figure 12:
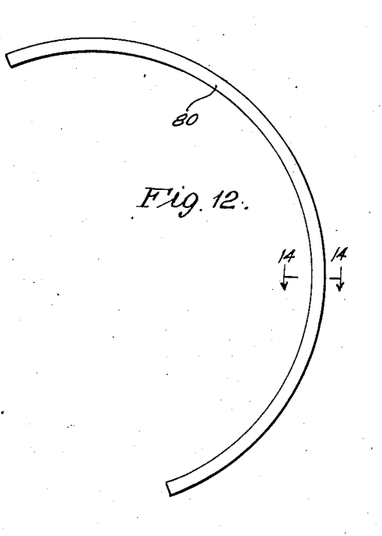
Fig. 12 is an elevation view of the cam.
Figure 13:
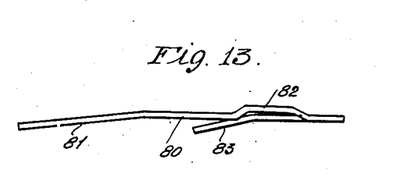
Fig. 13 is a plan view of the cam.
Figure 14:
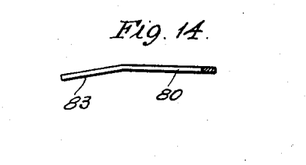
Fig. 14 is a sectional plan of the cam taken on line 14—14 of Fig. 12.
Figure 18:
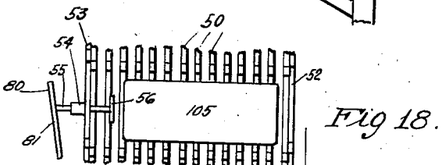
Figs. 18, 19, 20 and 21 are fragmentary views taken as indicated by the arrows 18—18, 19—19, 20—20, and 21—21 respectively in Fig. 11.

When the loaf enters the bread compartment of the carrier 19, the corresponding plunger rod 55 and bread engaging disk 56 are being held by their spring 86 in retracted position, the disk well clearing the end of the loaf, as indicated in Fig. 18. Means are then provided for advancing the plunger to move the disk into engagement with the loaf and hold it against the end plate 52 at the other side of the compartment while the bread is passed through the cutters, and to continue holding the then sliced bread by endwise pressure until it is ready to be delivered from the carrier. For this purpose, a semi-circular cam 80 is mounted, as by means of brackets 85, on the stationary end ring 17 (see Figs. 2, 8, 11 to 14, and 18 to 21). The outer ends of the plunger rods ride around in engagement with the inner surface of this cam member, which is contoured to actuate the plunger rods in opposition to the retracting spring 86. In Fig. 11 the fully retracted plunger 55 has just passed the end of the cam and is opposite an inwardly inclined section 81 thereof. As the carrier then moves the loaf forwardly, in the direction indicated by the arrow, the outer end of the plunger rod engages this inclined cam section 81, which then acts gradually to advance the plunger rod and thereby causes the disk 56 to engage the loaf and finally to press it over against the retaining side plate 52, as represented in Fig. 19. It is while the holding parts are in this position that the loaf passes through the cutters.

After thus passing through the cutters, the sliced bread is still held for a time by the plunger. It is at this point, i. e., just after passing through the cutters, that the sliced loaf is capped with a cardboard tray, or otherwise suitably bound. To accomplish this, an operator stands in front of or to the left of the machine, as viewed in Fig. 1, and simply places the cardboard tray 74 over the outwardly facing bottom side of the sliced loaf as it passes by. The fact that the bread is turned bottom side outward for this operation is especially to be noted, as this arrangement reduces the bread capping process to a single operation; the operator simply placing on the trays without handling the bread, whereas in the prior machines, in which the bread comes through top side up, it is necessary first to place the tray in position, then to pick up the sliced loaf and carefully set it into the tray. The speed of prior machines, in fact, is frequently limited by the speed at which the operator can place the sliced bread in the cardboard tray.

Figures 20, 21:
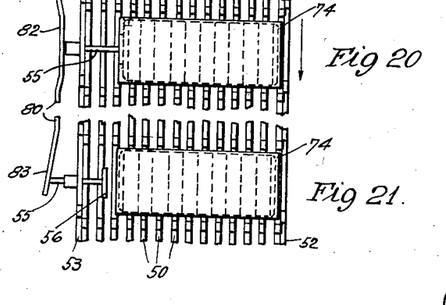

At the position corresponding to which the tray is to be placed on the sliced bread, the cam 80 is given an inward curve 82 that causes a slight further advance of the plunger, thereby compressing the bread slightly to facilitate the operation of placing on the tray (Fig. 20). As the bread then moves on, the straightening of the cam partially releases the pressure applied by the plunger rod and permits the bread to expand to its normal size within the tray or retaining device.

The rotating carrier then takes the sliced bread down past the horizontal position, where a redown taining device or guide means is provided to prevent the bread from falling out of the carrier compartments. This device is embodied in the form of a number of spring guide wires 84 mounted upon the frame of the machine and adapted resiliently to press against the trays on the bottom sides of the downwardly moving loaves. At a point where the bread is well within the confines of the retaining wires, the cam 80 has an outwardly inclined section 83 which permits the retracting springs 86 to pull the plungers 55 outwardly and thereby release the endwise pressure on the bread. The bread is then free to fall of its own weight onto the wires 84. These wires terminate at the lower side of the carrier at a point where the loaves are again substantially top side up, the loaves finally sliding off of the guide wires and dropping out of the carrier compartments upon a traveling conveyor belt 124 provided for the purpose of delivering the sliced bread from the machine. This conveyor belt passes over pulleys 125 and 126, the pulley 125 being fixed on a shaft mounted on the frame and driven by the sprocket 71, heretofore referred to, and the pulley 126 being carried by a frame bracket 127.

Since the travel of the plunger 55 is necessarily limited and is determined by its relation to the cam 80, the length of the plunger rod must be varied to accommodate loaves of varying sizes, i. e., a short loaf requires a plunger projecting farther into the bread carrying compartment 50b than does a long loaf. When such is the case, it is intended to replace the plunger rods with others of suitable length; and to permit this, the mounting of the plunger rod and disk on the plate 52 has been made as simple as possible. If the length of the plunger 55 when moved into the advanced position is then such as to interfere with the cutters 33 when passing through the bread cutting position, such interfering cutters must be removed to permit the unobstructed passage of the plunger and disk. This may be done as hereinbefore described. The remaining cutters will then be all that are required to slice the loaves passing through them.

The reasons for the peculiar formation and disposition of certain of the parts of the mechanism may now be appreciated. The provision of a continuously rotating bread carrier makes for speed and efficiency in a production machine in which the output rate is a factor vital to economy and practicability. Among the several further advantages residing in this arrangement may be mentioned the rolling motion given the bread as it is passed through the cutters, and the manner in which the sliced bread is carried downwardly from the cutters, bottom side outward, for the convenient application of the cardboard trays, combined with the final deliverance of the sliced loaves from the machine right side up. However, the provision of such a rotating carrier involves certain difficulties of arrangement and construction. For instance, in the present arrangement the cutter driving mechanism includes a crank shaft running through the rotary carrier. The presence of this shaft obviously means that the rotating carrier member cannot be mounted upon a usual axial shaft, and it is for this reason that the spaced roller mounting construction is employed. Rotary motion is then imparted to the carrier by the meshing driver member 77, as described. The spaced rings 50 are not interconnected and are consequently free to float or rotate independently of each other, but the driving bars 78, carried by star wheels 79, drive all of these rings 50 in unison with each other, as previously indicated.

Although in the above embodiment of my invention there is provided a power driven means for carrying the bread through the cutters, it is within the scope of the invention to adapt the machine for small capacity requirements by omitting the power drive means and operating the carrier manually. In such a simplified machine, the automatic feed to and from the carrier would be omitted and the individual loaves placed by hand, bottom side up, in the manually operated carrier. In such a case, of course, the carrier need not be in the form of a complete circle, but may embody only sufficient structure to provide for a single bread compartment. In such an adaptation the carrier may still be designed to carry the bread through the cutters in the manner characteristic of the invention, when the machine will have all of the advantages of the herein detailed form except the capacity of the latter.

In the present detailed form of the invention there is provided an automatic feeding device for transferring the bread from the feed conveyor belt 20, where it rides top side up, to a position bottom side out in the compartments 50b in the carrier, this function being accomplished by means of a feeding mechanism, indicated generally at 90 (see Figs. 1, 10, 15, 16 and 17). This feeding mechanism, which may be termed an inverter by reason of its function in placing the loaves in a bottom side out position on the carrier, is carried by a pair of frame plates 91 extending forwardly from the rear uprights 11a. Extending rearwardly from brackets 110 fastened to uprights 11a at a point substantially opposite these plates 91, are a pair of horizontal rods 111; a guide roller 112 for the belt 20 being mounted between brackets 110 adjacent uprights 11a, and a rear guide roller 113 for the belt being mounted between the rear ends of the rods 111. Mounted forwardly of and somewhat below roller 112, and between the forwardly extending plates 91 is a shaft 114a on which is provided a forward drive roller 114 for the belt. The conveyor belt 20 thus passes around the three rollers 112, 113 and 114, the belt taking a downwardly inclined path between rollers 112 and 114. The shaft 114a of roller 114 has on it a gear 116 meshing with a gear 115 on the shaft 69a on which the chain driven sprocket 69, heretofore referred to, is fastened. The driving roller 114 for the conveyor belt will thus be seen to be driven by the same continuous chain 67 that is utilized in the drive of the rotary bread carrier 19, and the gearing is such that the direction of travel of the upper side of the conveyor belt is forward, as indicated by the arrow in Fig. 1.

Mounted between the plates 91 just forwardly of roller 114 is a stationary bar 93 provided with spaced, forwardly extending pins or wires 95, these wires forming a platform in continuation of the downwardly inclining portion of the conveyor belt and serving to receive the forwardly traveling loaves of bread therefrom. Mounted between the extreme forward ends of the plates 91 is the inverting mechanism 90, which embodies a shaft 92 journalled at its ends in plates 91 and provided with four sets of 90 degree spaced pins or wires 94 thus forming an inverting stile; these wires being spaced between and adapted to turn through the spaces between the stationary wires 95 upon which the bread is received from the conveyor belt, and also being disposed to turn at the other side through the spaces between the projections or arms 50a of the rotating carrier 19. The relative disposition of the parts is such that the shaft 92 of the inverter is located substantially in the plane of the downwardly inclined stationary feed wires 95, and also over the carrier driver 77 and in such relation to the rotating bread carrier 19 that when rotated left handedly, as viewed in Fig. 1, a loaf of bread is picked up by its rotating feed wires 94 from the stationary wires 95, as loaf E in Fig. 1, will be carried over through the arc of a circle and positioned, bottom side outward, in a compartment 50b of the carrier.

The operating means for the inverter 90 is embodied as follows: Mounted directly below the shaft 92 of the inverter upon the upper end of a bracket arm 98 carried by a frame member 12 is a rotatable spindle 99 upon which is fixed a star wheel 100. The radial arms 100a of the star wheel are successively engaged and moved by the successive bars 78 of the carrier driver 77, which act to impart intermittent rotation to the star wheel, as will be understood. The spindle 99 of the star wheel carries a sprocket 101 which is connected by means of a chain 102 to another sprocket 103 fixed on the shaft 92 of the inverter. The inverter is thus operated through this chain connection from the intermittently driven star wheel 100. In the present instance there are four radial arms on the star wheel, and the relations are such that each engagement of a bar 78 with a star wheel arm 100a causes rotation of the inverter through 90 degrees.

The timing of the mechanism will more clearly be brought out hereinafter during the course of a description of the progress of a typical loaf of bread 105 as it assumes successive positions in the process of being fed to the carrier 19, as indicated by the letters A to F inclusive.

In operation, the operator places the loaves of bread on the conveyor belt 20 in the usual bottom side down position, as shown. A guard rail 120 is carried by the frame structure at the edge of the conveyor belt to properly position the loaves for handling by the inverting mechanism.

Four successive operative positions of the mechanism are illustrated in Figs. 15, 16, 17 and 1. In these figures successive driving bars 78 and corresponding radial star wheel arms of the carrier driver 77 are designated by the letters "a", "b" and "c". Considering a given loaf 105 placed in the position A upon the conveyor belt (Fig. 1), this loaf is carried through the successive positions B and C until it is delivered upon the stationary feed wires 95 in the position D of Fig. 15. It will be seen from Fig. 15 that the loaf is stopped in that position by engagement with the vertical feed wires 94 of the inverter, the loaf then resting within the compartment provided between the successive sets of feed wires of the inverter, which at that time is stationary since the driving bar "a" for the wheel 79 is coming out of engagement with the corresponding star wheel arm 100a. The next loaves follow up closely and come to rest in contact with each other on the inclined portion of the conveyor belt, which slides under the stopped loaves thereon.

Figures 15, 16:
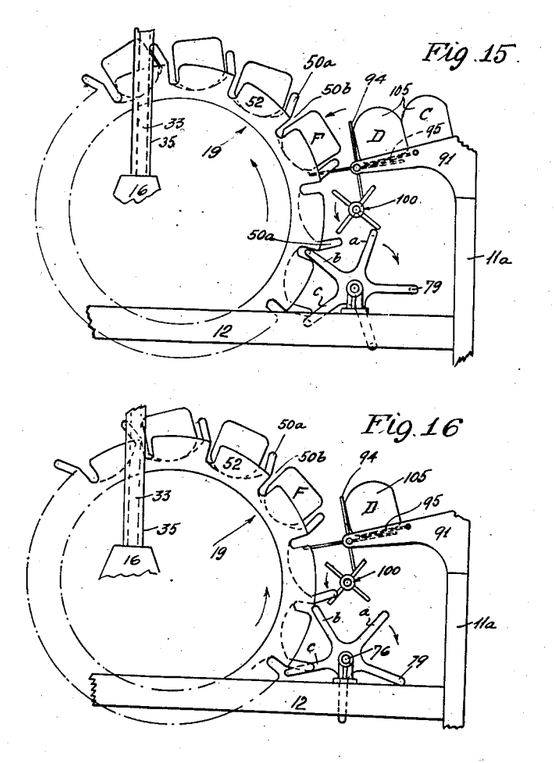
Figs. 15, 16 and 17 are diagrammatic views showing successive positions of the rotary carrier and driving mechanism.

While the bar "a" is thus coming out of engagement with the star wheel 100 in Fig. 15, the bar "b" is in full operative engagement with the under side of a projection 50a of the rotary carrier 19 and the carrier is therefore being driven forwardly at full speed.

As the mechanism moves from the position of Fig. 15 to the position of Fig. 16 the inverter does not move, for none of the bars 78 are in contact with the star wheel 100. It will be noted that in this position the bar "b" has just reached a point where the projections 50a of the carrier plates 50 are substantially tangential to the corresponding star wheel arm "b", and that the bar "c" has not yet come into engagement with the rotary carrier. This results in a slowing down of the carrier until the bar "c" picks up the load, as in Fig. 17, when the speed increases. The pause is timed to occur just as the cutters 33 engage the leading edge of the loaf (see Fig. 17), which results in the provision of a sufficient time interval for the cutters to penetrate the outer crust before the carrier speed is increased to pass the loaf quickly through the cutters.

Figure 17:
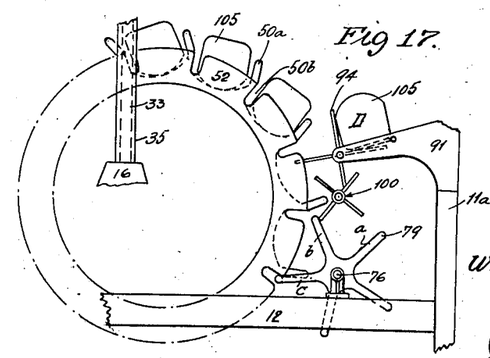

Fig. 17 shows the bar "c" after having taken up the load and the arm "b" just as it engages an arm 100a of the star wheel 100. In this position the star wheel has not been moved to actuate the inverter, and the loaf is still in the position D.

In Fig. 1 the bar "b" is in engagement with an arm of the star wheel and is in the course of moving the star wheel to actuate the inverter. The loaf is shown in a position D where it has been picked off of the stationary feed wires 95 by the feed wires 94 of the inverter and is being carried thereby through an arc of 90 degrees to finally be delivered, bottom side outward, within the bread carrier compartment which is at that instant in proper position to receive the overturned loaf.

Since the loaf at D (Fig. 16) is in contact with a succeeding loaf in position C, there is a tendency for the loaf C to be overturned in moving the first loaf from position D to position E (Fig. 1); and to prevent such occurrence a guard plate 121 is mounted between the upward projections of the plate 91 in such a manner as to extend out over the loaf in position C and prevent the raising of that loaf with the loaf at D.

The parts then move on to take a position again represented by Fig. 15, in which the loaf just overturned has been picked up by the carrier projections 50a and has been carried thereby up to the position F, and in which the succeeding loaf has been moved to the position D to await the next actuation of the inverter.

Thus, briefly, the mechanism is so designed and timed that as the successive compartments of the bread carrier reach the proper position opposite the feeding or inverting device 90, the inverting device is actuated to pick up a loaf resting right side up on the wires 95 and to turn the loaf through a quarter of a circle into a position within the proper carrier compartment with the bottom side of the loaf facing outward therein, when the loaf is picked up by the carrier and taken toward the cutters.

From position F the loaf passes through the course previously described to be sliced, bound together, and finally deposited upon the delivery conveyor belt.

Figure 22:
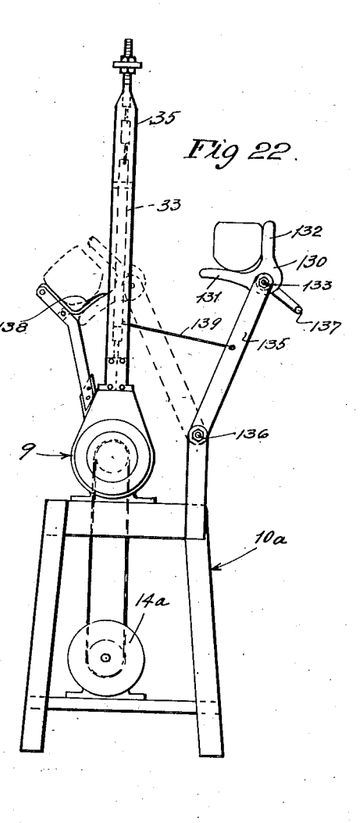
Figs. 22 and 23 are, respectively, side and front elevations of a modified form.
Figure 23:
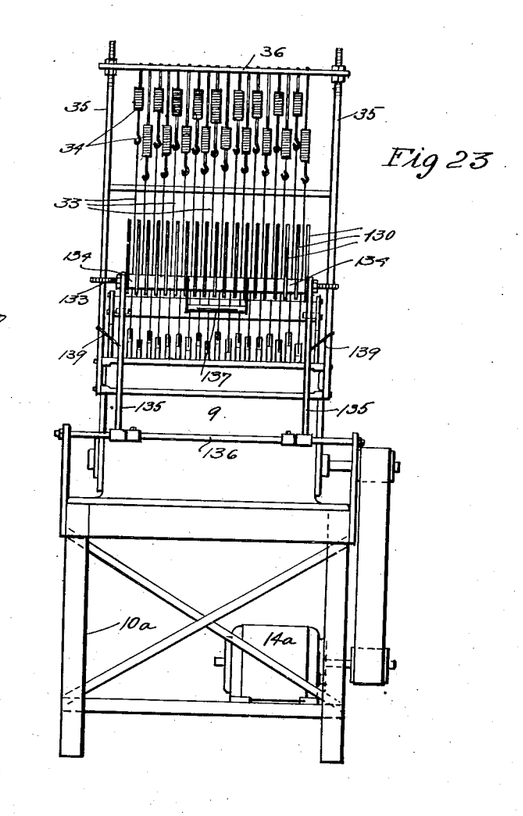

I have indicated how the machine as so far described may be somewhat simplified by the elimination of parts; and, in this same direction of simplification, I now describe a simple form of mechanism adapted particularly to hand operation and which includes some features of my invention. This simplified form of machine is shown in Figs. 22 and 23. Therein is shown a simple form of frame 10a carrying the driving motor 14a which drives the knife actuating mechanism 9 which may be the same as before described, actuating the cutters 33 in the same manner hereinbefore set forth. And, as before, the cutters may be supported in the frame work 35 and 36.

The carrier in this case is made up of a plurality of thin plate like elements 130, each of which may be described as being angular in form, or as having a horizontally projecting arm 131 and a vertically projecting arm 132, with the angle between the arms forming the notch or recess for receiving the loaf. These elements 130 are strung upon a rod or bolt 133 with intervening spacer washers 134, and the whole assembly clamped tightly upon the two supporting arms 135 mounted at their lower ends on the pivot rod 136. A handle 137 serves for manual oscillation of the carrier between the two positions indicated in Fig. 22.

Without the necessity of further structural description it will readily be seen how the loaf, supported by the carrier elements 130, is pressed into cutting engagement with the cutters, the carrier elements 130 passing between the cutters, so that the cut loaf is finally deposited upon the apron 138 fitted at the opposite side of the knives. When the cut loaf is thus deposited the carrier may be swung back to its full line position as shown in Fig. 22. Springs 139 may be employed to limit resiliently the outward movement of the carrier and to more or less balance the carrier to make inward movement easy. Inward movement of the knives may be stopped by any suitable stop arrangement, such for instance as may be had by allowing the ends of carrier bolt 133 to bring up against the uprights 35 of the cutter frame.

It will be understood the drawings and description are to be considered merely as illustrative of and not restrictive on the broader claims appended hereto, for various changes in design, structure and arrangement may be made without departing from the spirit and scope of said claims.

I claim:—

1. In a machine of the character described, the combination of a frame structure, a carrying member formed with a laterally extending bread taking compartment, means for rotatively mounting said bread carrying member on the fame structure so as to be capable of swinging a loaf of bread through an arc, a plurality of cutters mounted to work across the path of said arc, driving means for said cutters, and means for laterally holding the bread while passing through the cutters, said means embodying a plunger mounted at one end of the bread compartment and adapted to be moved forward to engage the bread and compress it against the other end of said compartment, a retracting spring acting to move the plunger to a normal position out of engagement with the bread, and means for actuating said plunger in opposition to said spring.

2. In a machine of the character described, the combination of a frame structure, a circular carrier member embodying a plurality of laterally spaced circular plates formed about their outer peripheries with spaced notches forming laterally extending bread carrying compartments, means for rotatably mounting said carrier member on the frame structure, means for rotating said carrier member, a plurality of cutters mounted to work across the path of the bread carrying compartments of the carrier member, driving means for said cutters, and means for laterally holding the bread during and after passing through the cutters.

3. In a machine of the character described, the combination of a frame structure, a circular carrier member embodying a plurality of laterally spaced circular plates formed about their outer peripheries with spaced notches forming laterally extending bread carrying compartments, means for rotatably mounting said carrier member on the frame structure, means for rotating said carrier member, a plurality of cutters mounted to work across the path of the bread carrying compartments of the carrier member, driving means for said cutters, and means for laterally holding the bread in the bread compartments, said means including a plunger mounted at an end of each bread compartment of the carrier and adapted to be moved inward to engage the bread and compress it against the other end of the bread compartment, and cam means for actuating said plungers to engage and hold the bread before reaching the cutters, and to release the bread at a time after leaving the cutters.

4. In a machine of the character described, the combination of a frame structure, a circular carrier member embodying a plurality of laterally spaced circular plates formed about their outer peripheries with spaced notches forming laterally extending bread carrying compartments, means for rotatably mounting said carrier member on the frame structure, means for rotating said carrier member, a plurality of cutters mounted to work across the path of the bread carrying compartments of the carrier member, driving means for said cutters, and means for laterally holding the bread in the bread compartments, said means including a plunger mounted at one end of each bread compartment of the carrier and adapted to be moved inwardly to engage the bread and compress it against the other end of the bread compartment, and a stationarily mounted arcuate cam against which the outer ends of the plungers ride, said cam having an initial inwardly inclined section to cause the plungers to engage the bread, and a final outwardly inclined section to allow the plungers to release the bread.

5. In a machine of the character described, the combination of a frame structure, a circular carrier member embodying a plurality of laterally spaced rings formed with spaced notches forming laterally extending carrier compartments, means for rotatably mounting said carrier member on the frame structure, means for rotating said carrier member, a plurality of cutters mounted to work between said rings and across the path of the carrier compartments, and operating means for the cutters located within said rings of the carrier member.

6. In a machine of the character described, a frame, a circular carrier member embodying a plurality of laterally spaced rings, means for rotatably mounting the carrier member on the frame, a plurality of cutter blades located between adjacent spaced rings and having one end exterior of the ring peripheries and the other end interior of the rings, and means at each blade end for movably supporting the cutter blades, one such means being located exterior of the rings and another interior of the rings.

7. In a machine of the character described, a frame, a circular carrier member embodying a plurality of laterally spaced rings, means for rotatably mounting the carrier member on the frame, a plurality of cutter blades located between adjacent spaced rings and having one end exterior of the ring peripheries and the other end interior of the rings, means exterior of the rings for movably supporting the exterior ends of the blades, and means interior of the rings for supporting and actuating the blades.

8. In a machine of the character described, the combination of a frame structure, a circular carrier member embodying a plurality of laterally spaced rings formed about their outer peripheries with spaced notches forming laterally extending carrier compartments, a plurality of circularly arranged rollers mounted on the frame structure and on which the rings of the carrier member are adapted to rotate, means for rotating the carrier member on said rollers, a plurality of cutters mounted to work between the rings of the carrier member and across the path of the carrier compartments thereof, and operating means for said cutters.

9. In a machine of the character described, the combination of a frame structure, a circular carrier member embodying a plurality of laterally spaced rings formed about their outer peripheries with spaced notches forming laterally extending carrier compartments, a plurality of circularly arranged rollers mounted on the frame structure and on which the rings of the carrier member are adapted to rotate, means for rotating the carrier member on said rollers, a plurality of cutters mounted to work between the rings of the carrier member and across the path of the carrier compartments thereof, and operating means for said cutters, located within the rings of the carrier member.

10. In a machine of the character described, the combination of a frame structure, a circular carrier member embodying a plurality of laterally spaced rings provided about their outer peripheries with outwardly projecting arms forming carrying compartments therebetween, means for rotatably mounting said carrier member on the frame structure, means for rotating said carrier member embodying a driving member meshing with the outwardly projecting arms of said rings, a plurality of cutters mounted to work between said rings of the carrier member and across the path of said compartments thereof, and operating means for said cutters.

11. In a machine of the character described, a frame, a bread carrier mounted to revolve on a horizontal axis on the frame and having peripheral bread receiving pockets extending axially of the carrier, a feeder delivering loaves to the pockets at the rising side of the carrier, cutters located near the upper part of the carrier and acting to cut a loaf in position in the upper part of the carrier, guide means located adjacent the descending side of said carrier and acting to hold the cut loaf on the carrier during travel at the downwardly moving side of the carrier, and a conveyer mounted near the lower part of the carrier in a position to receive the cut loaf.

12. In a machine of the character described, a frame, a bread carrier mounted to revolve on a horizontal axis on the frame and having peripheral bread receiving pockets extending axially of the carrier, a feeder delivering loaves to the pockets of the carrier, the feeder including a conveyer belt and a rotating feeder stile adapted to invert the loaf in delivering it to the carrier, cutters located near the upper part of the carrier and acting to cut a loaf in position in the upper part of the carrier, guide means located adjacent the descending side of said carrier and acting to hold the cut loaf on the carrier during travel at the downwardly moving side of the carrier, and a conveyer mounted near the lower part of the carrier in a position to receive the cut loaf.

13. In a machine of the character described, the combination of a rotary carrier member embodying a plurality of laterally spaced independently rotatable rings provided with projecting arms adapted to form carrier compartments therebetween, mounting means for rotatably mounting said rings, the rings being free to rotate independently of each other on said mounting means, a plurality of cutters respectively located in the spaces between said rings, and driving means for rotating in unison all of said independently rotatable rings.

14. In a machine of the character described, the combination of a rotary carrier member embodying a plurality of laterally spaced independently rotatable rings provided with projecting arms adapted to form carrier compartments therebetween, mounting means for rotatably mounting said rings, the rings being free to rotate independently of each other on said mounting means, a plurality of power driven cutter blades located in the spaces between said rings, means located exterior of said rings for operatively supporting one end of said cutter blades, means located interior of said rings for operatively supporting the other end of said cutter blades, and driving means for rotating in unison all of said independently rotatable rings comprising the rotary carrier member.

15. In a machine of the character described, a loaf carrying member operatively mounted to travel upwards at its one side and downwards at its other side and having loaf carrying compartments shaped to receive loaves of bread with their bottoms outward, a plurality of slicing knives mounted near the upper portion of said loaf carrying member and in such relation thereto as to slice the loaves carried by said loaf carrying compartments, and guide means located adjacent the path of said loaf carrying member and at a place beyond said slicing knives in the direction of travel of the loaf carrying member, said guide means being shaped to conform generally with the path of said loaf carrying member and being positioned to hold the sliced loaves of bread in said loaf carrying compartments until the movement of said loaf carrying member has turned the sliced loaves into substantially upright position with the loaf bottom downward.

16. In a machine of the character described, a rotary loaf carrying member mounted to rotate around a horizontal axis and having a plurality of loaf carrying compartments adapted to receive loaves of bread with their bottoms outward, a plurality of slicing knives mounted near the upper portion of said loaf carrying member and in such relation thereto as to slice the loaves carried by said loaf carrying compartments, and guide means located adjacent the path of said loaf carrying member and at a place beyond said slicing knives in the direction of rotation of the loaf carrying member, said guide means being curved to conform generally with the curved path of said loaf carrying member and being positioned to hold the sliced loaves of bread in said carrying compartments until the rotation of said loaf carrying member has turned the loaves into substantially upright position with the bottom of the loaf downward.

17. In a machine of the character described, a bread carrier mounted to revolve on a horizontal axis and having peripheral bread carrying compartments extending axially of the carrier, a feeder for delivering loaves of bread to said compartments, the feeder including a rotating stile arranged to invert the loaves, the feeder thereby delivering each loaf to the bread carrier with the bottom of the loaf outward, cutters located near the upper portion of said bread carrier for slicing the loaves carried thereby, and guide means located adjacent the path of said bread carrier at a place beyond said cutters in the direction of rotation of said bread carrier, said guide means being curved to conform generally with the curved path of said bread carrier and being positioned to hold the sliced loaves of bread in said carrying compartments until the rotation of said bread carrier has turned the sliced loaves into substantially upright position with the bottom of the loaf downward.

18. A detachable knife for a machine of the character described, said knife comprising the combination of an elongated blade sharpened along one of its long edges, and a relatively thick bearing member fastened to said blade near one end thereof for enlarging the bearing area locally along the rear non-cutting edge of the blade, said knife having an attaching expedient at the end where said bearing member is located, and said blade also having two attaching notches near the other end and at different distances from this other end, said notches respectively entering the blade from the two opposite long edges thereof.

19. In a machine of the character described, a frame, a circular carrier member embodying a plurality of laterally spaced rings, means for rotatably mounting the carrier member on the frame, a plurality of laterally spaced cutter blades located between adjacent rings and having one end exterior of the ring peripheries and the other end interior of the rings, means for reciprocating said cutter blades, and means for operatively supporting and guiding said blades in a lateral plane roughly embracing all of said blades and the projection of said plane passing substantially to one side of the center of rotation of said carrier member.

20. A slicing head including in combination, a stationary crossbar mounted on said head, a cutter drive shaft also mounted on said head, a plurality of reciprocatory cutters spaced apart from each other and mounted side by side on said head, means connected with one end of said cutters for transmitting power from said drive shaft to said cutters for reciprocating the cutters, tension springs connected between the other end of said cutters and said crossbar, a stationary cutter guide bar also mounted on said head near the place where said cutters are connected to said tension springs, said guide bar having spaced slots, and said cutters operating in said slots and having their rear non-cutting edges contacting with the base of said slots during the slicing operation.

21. A slicing head including in combination, a stationary crossbar adjustably mounted on said head, a cutter drive shaft also mounted on said head, a plurality of reciprocatory cutters spaced apart from each other and mounted side by side on said head, means connected with one end of said cutters for transmitting power from said drive shaft to said cutters for reciprocating the cutters, tension springs connected between the other end of said cutters and said crossbar, a stationary cutter guide bar also mounted on said head near the place where said cutters are connected to said tension springs, said guide bar having spaced slots, and said cutters operating in said slots and having their rear non-cutting edges contacting with the base of said slots during the slicing operation, and adjusting means for adjusting the position of said crossbar toward or away from said cutters to thereby simultaneously adjust the tension of all of said tension springs.

22. In a machine of the character described, a bread carrier mounted to revolve on a horizontal axis and having peripheral bread carrying pockets extending axially of the carrier, a feeder for delivering loaves of bread to said pockets, said feeder including a rotating stile the upper part of which rotates toward said bread carrier and inverts each loaf before delivering it to said bread carrier, and cutters located near the upper portion of said bread carrier for slicing the loaves as they are carried by said bread carrier.

23. In a machine of the character described, a plurality of bread slicing blades, a circular loaf carrier having a plurality of bread carrying compartments spaced around the periphery of said circular loaf carrier, said loaf carrier being rotatively mounted to feed the loaves of bread in the bread carrying compartment successively through said slicing blades, and means for rotatively driving said loaf carrier always in one direction but with variable speed movement which is slow as each loaf enters the blades, then becomes faster, and then slower.

24. In a slicer, the combination of a plurality of reciprocating slicing knives, a plurality of reciprocating tappets connected with the knives for operating the knives, a crank shaft, a plurality of connecting rods each connected to the crank shaft at one end and to a tappet at the other end, a crank case for housing said crank shaft and for acting as an oil reservoir, said crank case having a continuous opening through one of its ends and through its top, a tappet guide bar detachably fastened to the top of said crank case for guiding said tappets and for closing the top of said crank case, and an end closure member detachably fastened to the said open end of said crank case for closing that end of the crank case, the said continuous opening through the end and top of said crank case being so formed that when said guide bar and said end closure member are detached from the crank case, the assembled crank shaft, connecting rods and tappets as an assembled unit can be inserted into the crank case through the said open end and top of the crank case.

25. A slicing head including in combination, a stationary crossbar mounted on said head, a plurality of reciprocatory cutter blades spaced apart from each other and mounted on said head, guide means located on said head below said crossbar for guiding the upper ends of said reciprocatory cutter blades to move with vertical straight line motion, a plurality of tappets, the lower ends of said cutter blades being detachably connected to said tappets, a tappet guide means for guiding said tappets and restraining them to vertical straight line movement, a crank shaft having a plurality of cranks and located on said slicing head below said tappets, a plurality of connecting rods for operatively connecting the cranks of said crank shaft with the lower ends of said tappets, and a plurality of tension springs connected between said crossbar and said cutter blades for pulling said blades in opposition to said crank shaft.

26. In combination, a slicing head including a crossbar mounted on said head, a cutter drive shaft also mounted on said head, a plurality of reciprocatory bread cutters spaced apart from each other and mounted on said head, means for transmitting power from said drive shaft to said cutters for reciprocating the cutters, tension springs for the cutters and operatively connected between said crossbar and the cutters, each of said tension springs having a large helical body portion and a long and a short end stem portion, the neighboring springs being so arranged with respect to each other so that the large helical body portion of one spring comes in line with the end stem portion of the neighboring spring.

27. In a machine of the character described, the combination of a frame structure, an annularly shaped carrier member having a plurality of laterally extending rows of arms projecting outwardly, each such row comprising a plurality of said arms spaced laterally apart from each other, said rows of arms cooperating to form a plurality of laterally extending carrier compartments on the outer periphery of said annularly shaped carrier member, a plurality of rollers mounted on said frame and adapted to rotatably support said annularly shaped carrier member by contacting it at certain places on its periphery, driving means for rotating said annularly shaped carrier member on said rollers, a plurality of slicer knives operatively mounted in the path of said carrier compartments and laterally spaced from each other to correspond with the lateral spacing of said arms of the carrier member so that the arms pass between the knives during rotation of said carrier member, and driving means for operating said knives.

28. In a machine of the character described, the combination of a rotary loaf carrying member mounted to rotate around a horizontal axis and having a plurality of loaf carrying compartments formed to receive loaves of bread with their bottoms outward, a plurality of slicing knives mounted in such relation to said loaf-carrying member as to slice the loaves carried by said loaf-carrying compartments, feeder mechanism including a feeder table adapted to receive loaves of bread with their bottoms downward and feeding toward said loaf-carrying member from one side thereof, said feeder mechanism also including an inverter member between said table and said loaf-carrying member for inverting and delivering the loaves to said loaf-carrying compartments with their bottoms outward, guide means located adjacent to said loaf-carrying member and at a place beyond said slicing knives, said guide means being curved to conform generally with the curve of said loaf-carrying member and being positioned to hold the sliced loaves of bread in said loaf-carrying compartments until the rotation of said loaf-carrying member has turned the loaves toward an upright position with the bottom of the loaf downward, and a discharge conveyor adapted to receive said loaves of bread with their bottoms downward as they leave said guide means and to convey the sliced loaves away from the loaf-carrying member in a path generally below said feeder table and in a direction generally opposite to the feeding movement of the loaves on the feeding table.

29. A slicing head including in combination, a stationary crossbar mounted on said head, a cutter drive shaft also mounted on said head, a plurality of reciprocatory cutters spaced apart from each other and mounted side by side on said head, means connected with one end of said cutters for transmitting power from said drive shaft to said cutters for reciprocating the cutters, cutter tensioning means connected with the other end of said cutters and adapted to pull on the cutters in a direction away from said drive shaft, said cutter tensioning means including springs supported by said crossbar, a stationary cutter guide bar also mounted on said head, said guide bar having slots spaced to correspond with the spacing between said cutters, and said cutters operating in said slots, the width of said slots with respect to the thickness of said cutters at the slots being only sufficient for the slots to guide the sides of the cutters to hold the cutters straight during cutting.

30. A slicing head including in combination, a stationary crossbar mounted on said head, a cutter drive shaft also mounted on said head, a plurality of reciprocatory cutters spaced apart from each other and mounted side by side on said head, means guided to reciprocate in a straight line and connected with one end of said cutters for transmitting power from said drive shaft to said cutters to reciprocate the cutters and to guide the said connected ends of said cutters in a straight line, cutter tensioning means connected with the other end of said cutters and adapted to pull on the cutters in a direction away from said drive shaft, said cutter tensioning means including springs supported by said stationary crossbar, a stationary cutter guide bar also mounted on said head, said guide bar having slots spaced to correspond with the spacing between said cutters, and said cutters operating in said slots, the width of said slots with respect to the thickness of said cutters at the slots being only sufficient for the slots to guide the sides of the cutters to hold the cutters straight during cutting.

31. In a slicing machine, the combination of a plurality of reciprocatory cutters, means for feeding the material to be sliced to said cutters, a rotatably mounted crank shaft having a plurality of cranks thereon the adjacent ones of said cranks being approximately opposed to each other and the alternate ones of said cranks being progressively out of phase with each other to thereby form spiralled and approximately opposed series of cranks along said shaft, a plurality of cutter driving mechanisms connected to said cutters for reciprocating same, each of said cranks on said crank shaft being operatively engaged by one of said cutter driving mechanisms to thereby reciprocate said cutters when said crank shaft is rotated.

32. In a slicing machine, the combination of a plurality of reciprocatory cutters, means for feeding the material to be sliced to said cutters, a rotatably mounted crank shaft having a plurality of cranks thereon the adjacent ones of said cranks being approximately opposed to each other and the alternate ones of said cranks being progressively out of phase with each other to thereby form spiralled and approximately opposed series of cranks along said shaft, a plurality of cutter driving mechanisms each of which is connected to a single cutter and is also operatively engaged by one of said cranks on said crank shaft, to thereby reciprocate said cutters when said crank shaft is rotated.

33. A slicing head including in combination, a stationary crossbar mounted on said head, a drive shaft also mounted on said head and having a plurality of cranks the adjacent ones of said cranks being approximately opposed to each other, a plurality of reciprocatory cutters mounted on said head to operate in the space between said drive shaft and said stationary crossbar, a reciprocatory tappet for each cutter connected to the end of the cutter nearest said drive shaft, each such tappet being guided to reciprocate in a straight line passing approximately through the center of said drive shaft, a connecting rod for each such tappet operatively connecting the tappet to one of said cranks on said crank shaft, and cutter tensioning means for each cutter connected to the end of the cutter farthest from said drive shaft, each such cutter tensioning means including a spring supported by said stationary crossbar, and said cutter tensioning means being adapted to pull on the cutters in a direction away from said crank shaft.

WILLIAM WALTER HARTMAN.